(12) United States Patent
Hyatt et al.

(10) Patent No.: US 8,015,902 B2
(45) Date of Patent: Sep. 13, 2011

(54) MACHINE TOOL AND WORKPIECE INNER SURFACE MACHINING METHOD USING THE MACHINE TOOL

(75) Inventors: Gregory Aaron Hyatt, South Barrington, IL (US); Abhijit Uday Sahasrabudhe, Wheeling, IL (US); James Allen Lankford, Elk Grove Village, IL (US)

(73) Assignee: Mori Seiki Co., Ltd., Yamatokoriyama-shi, Nara-ken (JP)

( * ) Notice: Subject to any disclaimer, the term of this patent is extended or adjusted under 35 U.S.C. 154(b) by 337 days.

(21) Appl. No.: 12/421,564

(22) Filed: Apr. 9, 2009

(65) Prior Publication Data

US 2010/0257980 A1    Oct. 14, 2010

(51) Int. Cl.
*B23B 1/00* (2006.01)
*B23B 5/40* (2006.01)
(52) U.S. Cl. .......................................... 82/1.11; 82/1.5
(58) Field of Classification Search ................... 82/1.11, 82/1.5, 1.2, 82, 117, 157; 29/27 C, 41
See application file for complete search history.

(56) References Cited

U.S. PATENT DOCUMENTS

| | | | | | |
|---|---|---|---|---|---|
| 2,725,776 | A | * | 12/1955 | Hopkins | 82/11.5 |
| 2,933,965 | A | * | 4/1960 | Murphy | 82/12 |
| 3,447,245 | A | * | 6/1969 | Holdridge | 33/636 |
| 3,662,040 | A | * | 5/1972 | Urbach et al. | 264/1.8 |
| 4,679,471 | A | * | 7/1987 | Wauchope et al. | 82/12 |
| 6,122,999 | A | * | 9/2000 | Durazo et al. | 82/1.11 |
| 6,318,220 | B1 | * | 11/2001 | Erdel | 82/1.11 |

* cited by examiner

*Primary Examiner* — Will Fridie, Jr.
(74) *Attorney, Agent, or Firm* — Smith Patent Office

(57) ABSTRACT

To provide a machine tool including a workpiece inner surface machining tool which is not only capable of machining an inner surface of a workpiece into a spherical shape but also capable of machining a bearing surface which is a flat surface and machining the combination of a spherical surface and a flat surface. A machine tool 1 machines a surface to be machined m1 located on an inner surface of a workpiece 21 by a tool 20 having: a supporting member 22; a cutting tool 23 which is supported to be pivotable about a support shaft 19 located on a plane b' perpendicular to an axis a of the supporting member 22 and has a cutting edge 23a at one end; a drive shaft 24 pivoting the cutting tool 23 by moving in an axis a direction; and a link member 25. The tool 20 is supported by a tool post 5, the drive shaft 24 is movable in the axial direction by the movable base 4, and an axial position of the movable base 4 and an axial position of the tool post 5 are controlled so as to cause a machining point P by the cutting edge 23a to move along a desired machining line while the workpiece 21 is rotated by the spindle headstock 3.

11 Claims, 10 Drawing Sheets

MACHINE TOOL AND WORKPIECE INNER SURFACE MACHINING METHOD USING THE MACHINE TOOL

BACKGROUND OF THE INVENTION

1. Field of the Invention

The present invention relates to a machine tool machining an inner surface to be machined located on an inner surface of a workpiece, and to a workpiece inner surface machining method using the machine tool.

2. Description of the Related Art

As a conventional machine tool machining a spherical surface to be machined such as, for example, an inner surface of a differential gear case of an automobile, there is one described in U.S. Pat. No. 6,318,220B1, for instance. This machine tool uses a tool having a supporting member and a bar-shaped cutting tool supported by the supporting member to be pivotable about a pivot axis orthogonal to an axis of the supporting member. The cutting tool has cutting edges at its one end and another end and is pivotably supported so as to eject/retract from/into the supporting member. At the time of the machining, the tool is inserted into a workpiece while the cutting tool is held at a retracted position, and the cutting tool is pivoted about the pivot axis, so that the cutting edges cut the inner surface of the workpiece into an arcuate shape. Subsequently, the supporting member is slightly rotated about its axis and the cutting tool is pivoted again about the pivot axis. By repeating this operation, the inner surface of the workpiece is machined into a spherical shape.

The machining method described in the aforesaid U.S. Pat. No. 6,318,220B1 is capable of machining the inner surface of the workpiece into the spherical shape, but is not capable of machining a bearing surface which is a flat surface orthogonal to the axis of the supporting member. Another tool is used to machine the bearing surface.

SUMMARY OF THE INVENTION

The present invention was made in consideration of the above-described conventional circumstances, and an object thereof is to provide a machine tool not only capable of machining an inner surface of a workpiece into a spherical shape but also capable of machining a bearing surface which is a flat surface and machining the combination of a spherical surface and a flat surface, and to provide a workpiece inner surface machining method using the machine tool.

According to one aspect of the present invention, there is provided a machine tool which machines a surface to be machined located on an inner surface of a workpiece gripped by a spindle headstock, the machine tool including: the spindle headstock gripping the workpiece; a movable base disposed coaxially with the spindle headstock to be movable in an axial direction; and a tool post disposed between the movable base and the spindle headstock to be movable in the axial direction, wherein the tool post supports a tool having: a supporting member; a cutting tool which is supported to be pivotable about a pivot axis located on a plane perpendicular to an axis of the supporting member and has a cutting edge at one end; and a driving member pivoting the cutting tool by moving in the axial direction, wherein the axial-direction movement of the driving member is enabled by the movable base, and wherein, when the surface to be machined of the workpiece is machined, an axial position of the movable base and an axial position of the tool post are controlled so as to cause a machining point by the cutting edge to move along a desired machining line.

According to another aspect of the present invention, there is provided a workpiece inner surface machining method of machining a surface to be machined located on an inner surface of a workpiece by a machine tool which includes: a spindle headstock gripping the workpiece; a movable base disposed coaxially with the spindle headstock to be movable in an axial direction; a tool post disposed between the movable base and the spindle headstock to be movable in the axial direction; and a tool having: a supporting member; a cutting tool which is supported to be pivotable about a pivot axis located on a plane perpendicular to an axis of the supporting member and has a cutting edge at one end; and a driving member pivoting the cutting tool by moving in the axial direction, the method including:

a first step of supporting the workpiece by the spindle headstock; a second step of supporting the tool by the tool post; a third step of inserting the tool into the workpiece by moving the tool post to position the cutting tool at a machining start position; and a fourth step of controlling an axial position of the movable base and an axial position of the tool post so as to cause a machining point by the cutting edge to move along a desired machining line.

According to the invention relating to the machine tool and the invention relating to the machining method, the tool is adopted whose supporting member pivotably supports the cutting tool and whose driving member pivots the cutting tool, the tool is supported by the tool post, the cutting tool is pivoted by the movable base, and the axial position of the movable base and the axial position of the tool post are controlled so that the machining point moves along the desired machining line. This structure enables the machining of both a spherical surface to be machined and a flat surface to be machined.

In a preferable embodiment of the invention relating to the machine tool, the spindle headstock rotates the workpiece as well as gripping the workpiece. In still another preferable embodiment, the movable base is one of a tailstock, a second spindle headstock, and a second tool post disposed coaxially with the spindle headstock to be movable in the axial direction, and when the surface to be machined of the workpiece is machined, the tool is moved in the axial direction by the movement of the tool post, and the workpiece is rotated by the spindle headstock while the cutting tool is pivoted by the movement of the movable base.

According to the embodiment relating to the machine tool, since the workpiece is gripped and rotated by the spindle headstock, it is possible to machine a spherical surface to be machined and a flat surface to be machined more easily and surely in a shorter time.

Further, a Z-axis direction moving function of the movable base which is the tailstock, the second spindle headstock, the second tool post, or the like is utilized in order to pivot the cutting tool, and a Z-axis direction moving function of the tool post is utilized in order to move the supporting member in the Z-axis direction. This makes it possible to machine not only a spherical surface to be machined but also a flat surface to be machined such as a bearing surface by making use of a function of an existing lathe.

In yet another preferable embodiment of the invention relating to the machine tool, the movable base is one of a tailstock, a second spindle headstock, and a second tool post disposed coaxially with the spindle headstock to be movable in the axial direction, and when the surface to be machined of the workpiece is machined, the tool is moved in the axial direction by the movement of the tool post, and the tool is rotated by the tool post while the cutting tool is pivoted by the movement of the movable base.

According to the embodiment relating to the machine tool, when the surface to be machined of the workpiece is machined, the tool is moved in the axial direction by the movement of the tool post, and the tool is rotated by the tool post while the cutting tool is pivoted by the movement of the movable base. This can realize the machining of the surface to be machined without rotating the workpiece.

In a preferable embodiment of the invention relating to the machining method, when the surface to be machined is a flat surface perpendicular to the axis of the supporting member, in the fourth step, the tool post changes the axial position of the supporting member as the movable base changes a pivot angle of the cutting tool.

According to the embodiment of the invention relating to the machining method, in the fourth step, the tool post changes the axial position of the supporting member as the movable base changes the pivot angle of the cutting tool. This makes it possible to machine a surface to be machined without any trouble even if the surface to be machined is a flat surface perpendicular to the axis of the supporting member.

In yet another preferable embodiment of the invention relating to the machining method, when the surface to be machined is a spherical surface whose center is at a point located on the axis, in the fourth step, the movable base changes a pivot angle of the cutting tool, and the tool post keeps the axial position of the supporting member fixed.

According to the embodiment of the invention relating to the machining method, in the fourth step, the movable base changes the pivot angle of the cutting tool, and the tool post keeps the axial position of the supporting member fixed. This makes it possible to machine a surface to be machined without any trouble even if the surface to be machined is a spherical surface whose center is at the point located on the axis.

DETAILED DESCRIPTION OF THE PREFERRED EMBODIMENT

Figure 1:
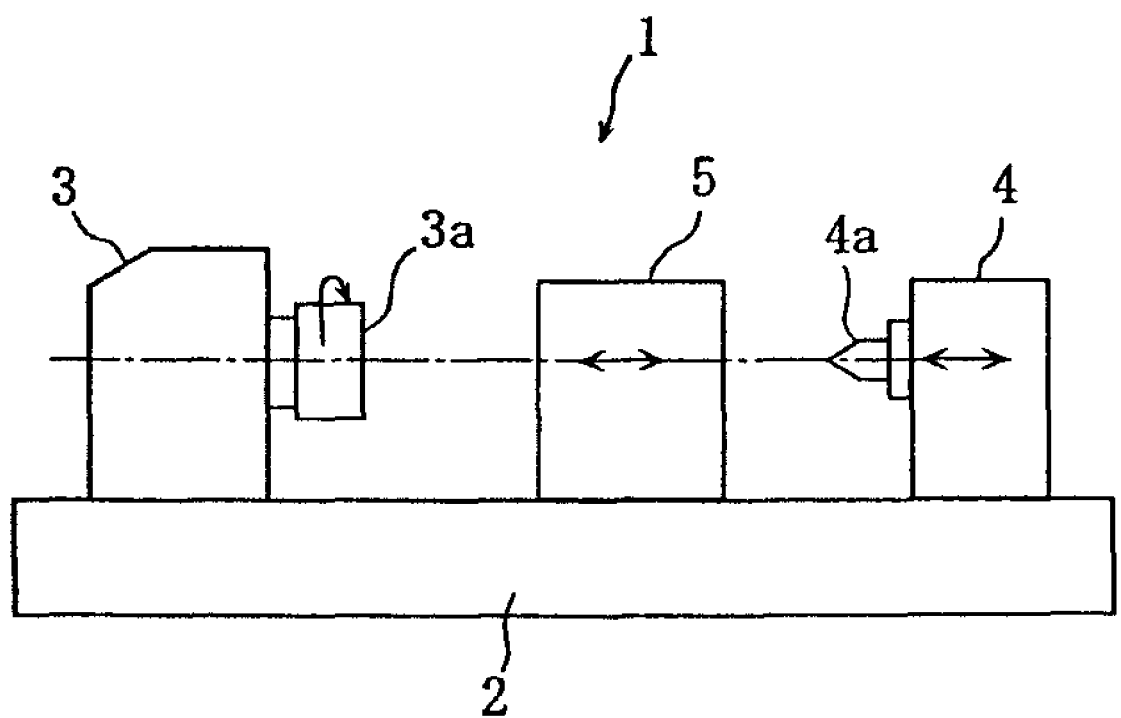
FIG. 1 is a schematic structural view of a lathe according to an embodiment of the present invention.

Hereinafter, an embodiment of the present invention will be described with reference to the attached drawings.

FIG. 1 to FIG. 10 are views used to explain a machine tool according to an embodiment of the present invention and a workpiece inner surface machining method using the machine tool. In this embodiment, front, rear, left, and right refer to front, rear, left, and right in a state where the machine tool is viewed from its front surface side (state shown in FIG. 1).

In these drawings, reference numeral 1 denotes a lathe. The lathe 1 includes a bed 2, a spindle headstock 3 disposed on a left end portion of the bed 2, a tailstock (movable base) 4 disposed on a right side of the spindle headstock 3 coaxially with the spindle headstock 3 to be movable in a Z-axis direction (right and left direction in the drawings), and a tool post 5 disposed between the tailstock 4 and the spindle headstock 3 to be movable in the Z-axis direction.

A tool 20 of this embodiment is supported by the tool post 4. By using the tool 20, the lathe 1 according to this embodiment is capable of machining surfaces to be machined such as, for example, a flat bearing surface located on an inner surface of, for example, a differential gear case 21 constituting an outer shell of a differential gear of an automobile.

The tool 20 includes a supporting member 22 made of a round rod, a cutting tool 23 supported to be pivotable about a pivot axis b located on a plane b' perpendicular to an axis a of the supporting member 22, a drive shaft 24 pivoting the cutting tool 23, and a link member 25 coupling the drive shaft 24 and the cutting tool 23. The drive shaft 24 and the link member 25 constitute a driving member pivoting the cutting tool 23.

The pivot axis b may be apart from the axis a or may intersect with the axis a.

At an axially left portion of the supporting member 22, a housing/support portion 22c supporting the cutting tool 23 in a housed state is formed in a slit shape. The cutting tool 23 is disposed in the housing/support portion 22c and is pivotably supported by a support shaft 19 coaxially arranged with the pivot axis b. A chip (cutting edge) 23a is bolted to a tip of the cutting tool 23, and a contact point where a tip of the chip 23a comes into contact with a surface to be machined is a machining point P.

Further, in the supporting member 22, a support hole 22d is formed linearly and coaxially with the axis a so as to communicate with the housing/support portion 22c. In the support hole 22d, the drive shaft 24 is disposed to be slidable in the axial direction. One end portion 25a of the link member 25 is pivotably coupled to an end portion 24a of the drive shaft 24 via a coupling pin 25c. Further, the other end portion 25b of the link member 25 is coupled to the cutting tool 23 via a coupling pin 25d. The coupling pin 25d is located at a position deviated from the pivot axis b of the cutting tool 23. Further, the support hole 22d has an escape portion 22e which is formed at a portion facing the link member 25 to avoid the interference with the link member 25. The cutting tool 23 pivots about the pivot axis b according to the forward or backward movement of the drive shaft 24.

Further, in the supporting member 22, a guide pin 27 is implanted so as to project into the support hole 22d. A tip portion 27a of the guide pin 27 is slidably mated with a guide groove 24e formed in a groove shape in the drive shaft 24, so that the drive shaft 24 is rotatable with the supporting member 22 and independently movable in the axial direction. Further, the drive shaft 24 is biased at its retreat end position by a return spring, not shown, so that the cutting tool 23 is normally in the retracted state in the housing/support portion 22c.

The spindle headstock 3 grips a left boss portion 21a of the differential gear case 21 by a chuck 3a to set a Z-axial position of the differential gear case 21 and rotary drives the differential gear case 21.

The differential gear case 21 as an object to be machined has left and right boss portions 21a, 21b and a flange portion 21c. Left and right through holes 21a', 21b' are formed in the left and right boss portions 21a, 21b. As surfaces to be machined, the differential gear case 21 further has, on its inner surface, a left bearing surface m1 and a right bearing surface m2 which are flat surfaces perpendicular to the axis a.

The machining of the left bearing surface m1 of the differential gear case 21 by the lathe 1 including the tool 20 will be described.

Figure 2:
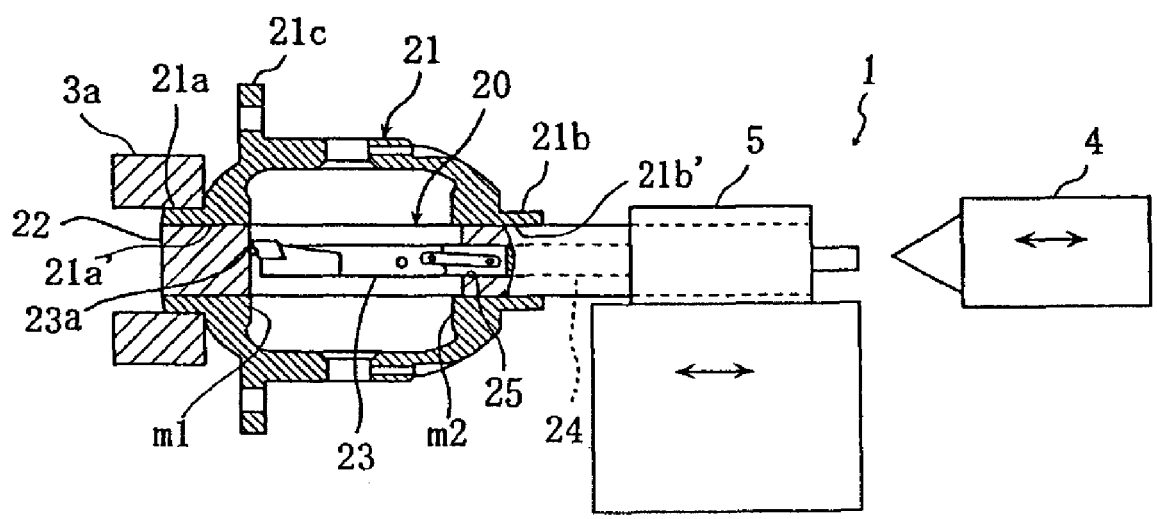
FIG. 2 is a schematic structural view showing a state where a tool of the lathe is set.
Figure 3:
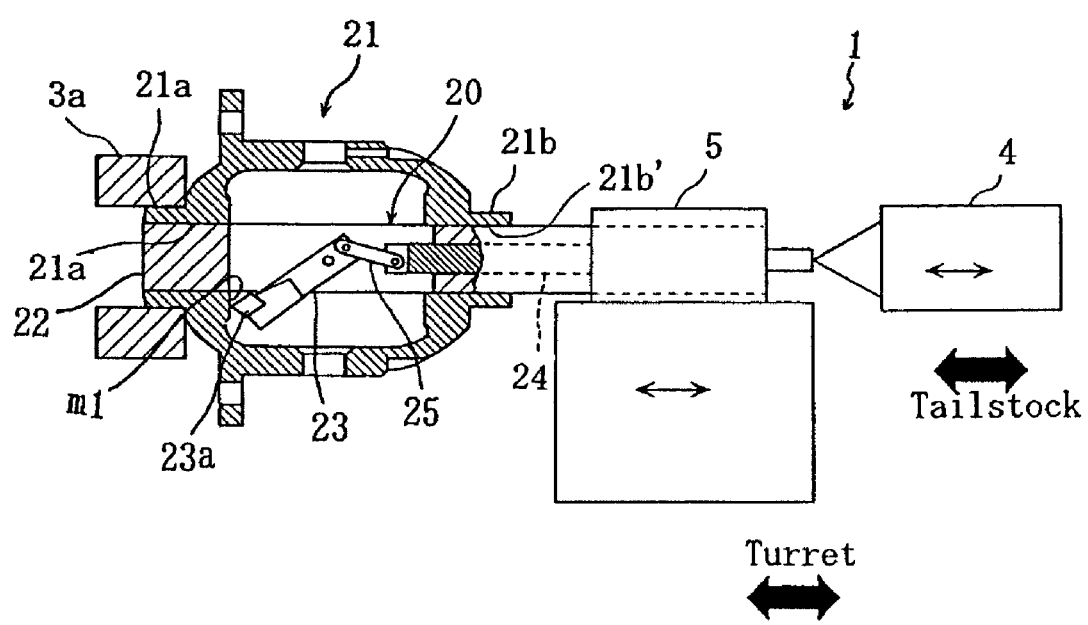
FIG. 3 is a schematic structural view showing the operation of the tool.

The chuck 3a of the spindle headstock 3 grips the left boss portion 21a of the differential gear case 21 to keep the differential gear case 21 at a predetermined Z-axis direction position (first step, see FIG. 2).

The tool 20 is supported by the tool post 5 (second step). In this case, the cutting tool 23 is in the retracted state in the housing/support portion 22c of the supporting member 22 (see FIG. 7).

In this state, the tool post 5 is moved in the Z-axis direction toward the spindle headstock 3, whereby a front end portion 22f of the supporting member 22 of the tool 20 is inserted into the differential gear case 21 from the right side through the through holes 21b', 21a', and the cutting tool 23, more concretely, the cutting edge 23a is made to coincide with the left bearing surface m1 as the surface to be machined (third step).

Figure 8:
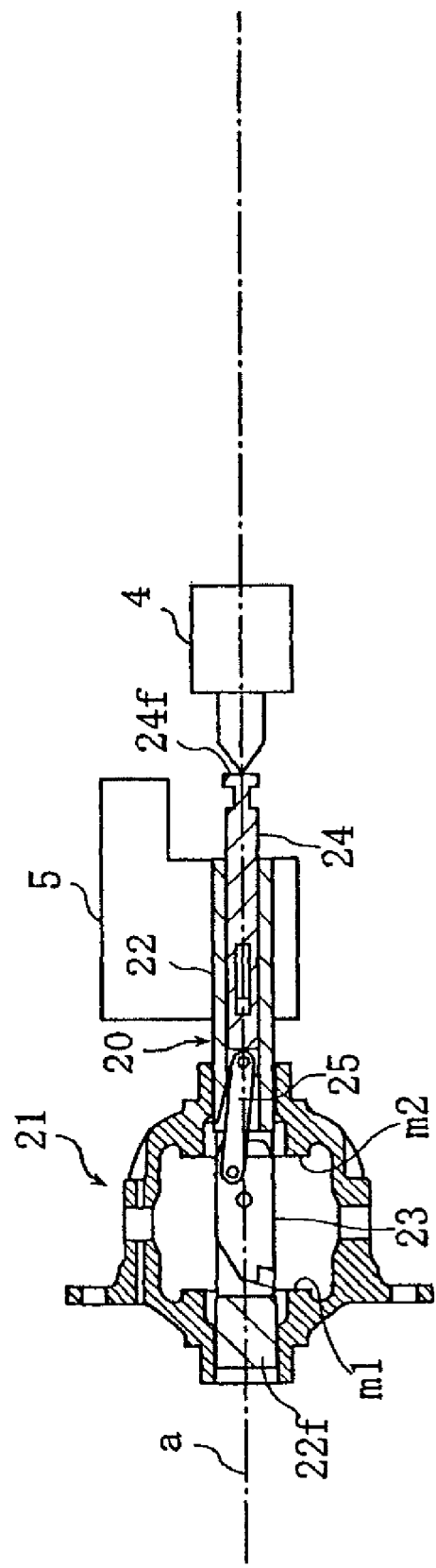
FIG. 8 is a schematic view used to explain the workpiece machining method using the tool.
Figure 9:
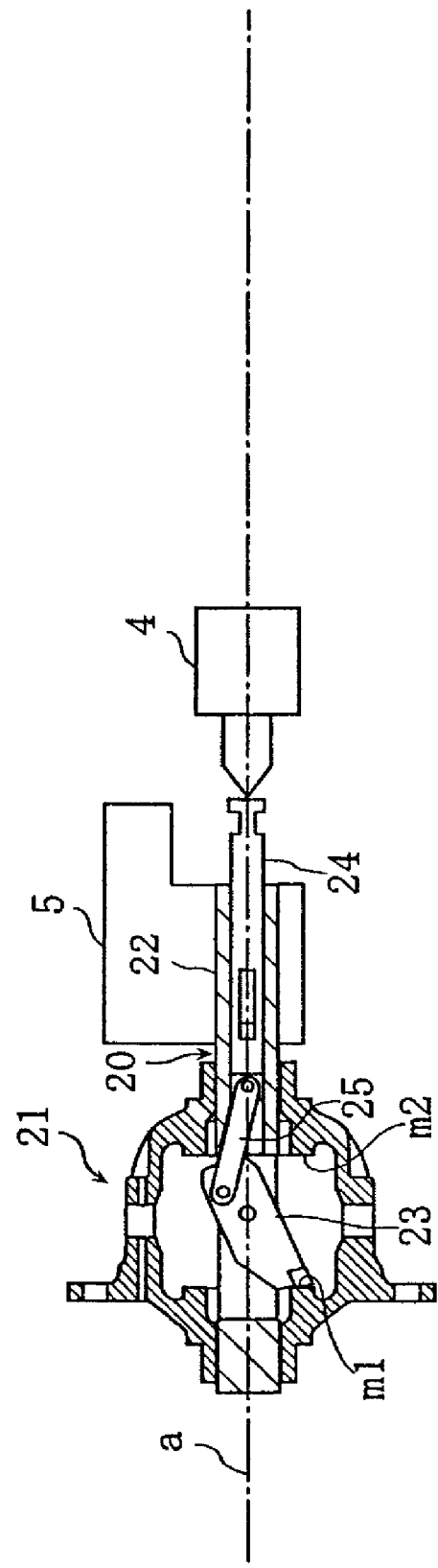
FIG. 9 is a schematic view used to explain the workpiece machining method using the tool.
Figure 10:
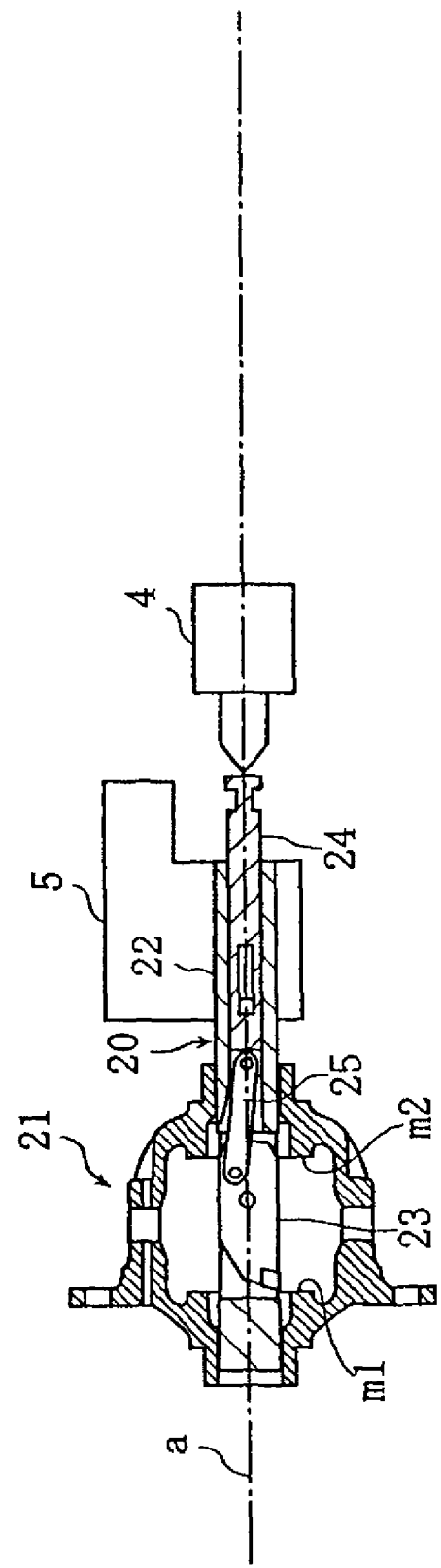
FIG. 10 is a schematic view used to explain the workpiece machining method using the tool.

Then, the tailstock 4 is moved so that its quill 4a comes close to an outer end surface 24f of the drive shaft 24 (see FIG. 8). The drive shaft 24 is further moved to pivot the cutting tool 23 about the support shaft 19, and the Z-axis direction positions of the tailstock 4 and the tool post 5, and as a result, the positions of the drive shaft 24 and the supporting member 22 are controlled so that the chip 23a of the cutting tool 23 moves on the left bearing surface m1 along a machining line orthogonal to the axis a (fourth step).

Figure 4:
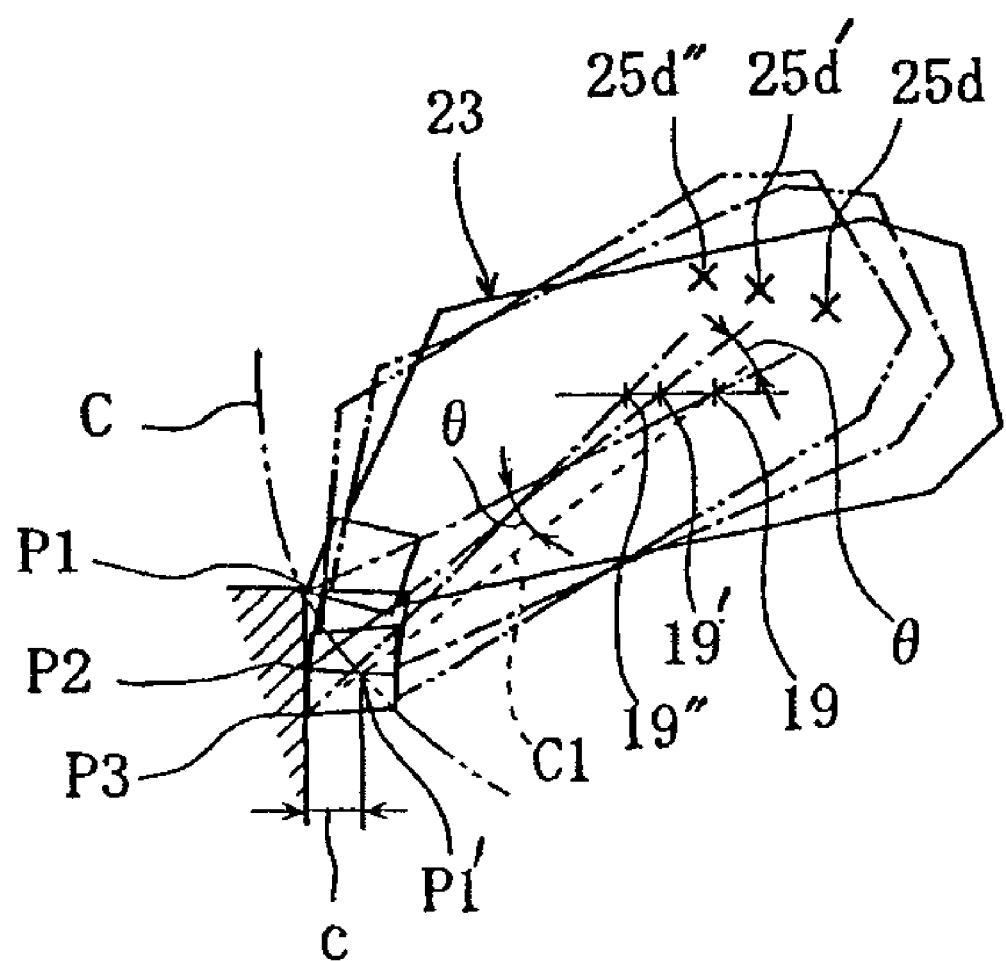
FIG. 4 is a schematic view used to explain an operation principle of the tool.
Figure 5:
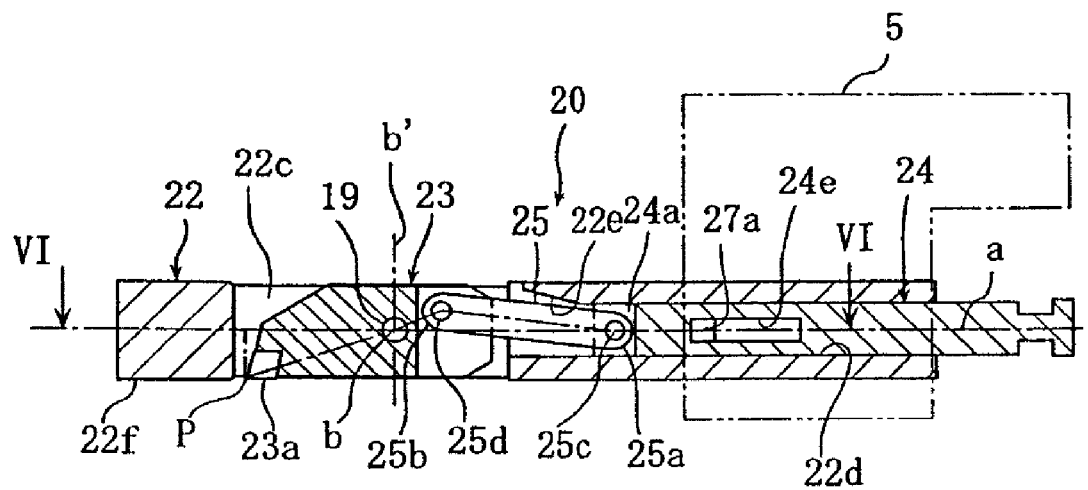
FIG. 5 is a side sectional view schematically showing the structure of the tool.
Figure 6:
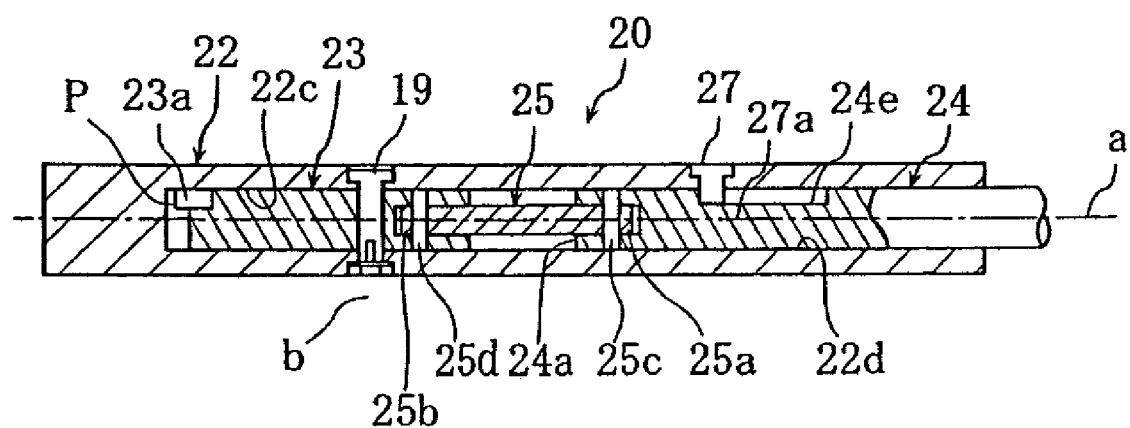
FIG. 6 is a sectional view schematically showing the structure of the tool taken along the VI-VI line in FIG. 5.
Figure 7:
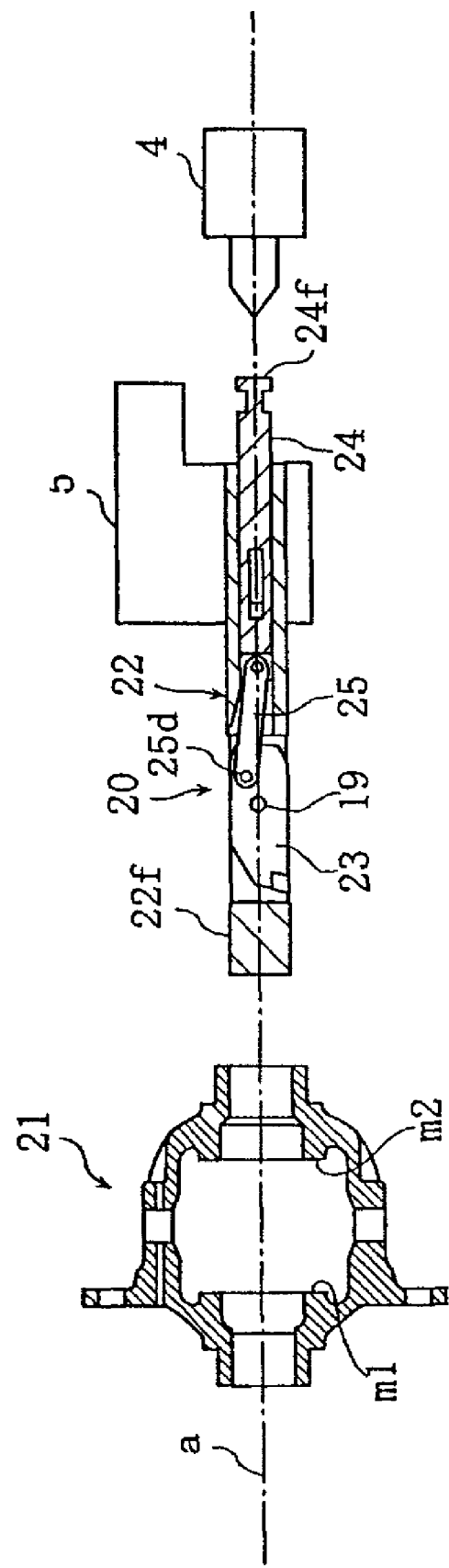
FIG. 7 is a schematic view used to explain a workpiece machining method using the tool.

Concretely, controlling the Z-axis direction position of the tailstock 4 causes the cutting tool 23 to pivot about the support shaft 19. For example, as shown in FIG. 4, a machining point P1 moves on an arc C whose center is on the support shaft 19, but in this case, when the pin 25d of the link member 25 moves to 25' by the movement of the drive shaft 24 so that the pivot angle increases by θ, the machining point P1 moves to P1' located at an intersection between a straight line C1 and the arc C to be apart from the left bearing surface m1 in the Z axis direction by c. The straight line C1 is a straight line passing through the support shaft 19 when the pivot angle is θ.

In this embodiment, the Z-axis direction position of the tool post 5 is controlled so that simultaneously with the aforesaid pivoting, the machining point P1' moves leftward in the Z-axis direction by c to coincide with a machining point P2 on the left bearing surface m1. The same applies to a machining point P3 when the pin 25d' moves to 25d''. Consequently, the machining point P moves from P1 to P3 linearly along the machining line on the left bearing surface m1.

While the machining point P of the chip 23a is moved along the machining line in the above-described manner, the differential gear case 21 is rotary driven by the spindle headstock 3. Consequently, the left bearing surface m1 is machined (see FIG. 9). The right bearing surface m2 is machined in the same manner.

When the machining is finished, the tool post 5 and the tailstock 4 move back rightward, so that the cutting tool 23 retracts into the housing/support portion 22c (see FIG. 10), and the tool post 5 and the tailstock 4 further return to the original positions, so that the tool 20 is located outside the differential gear case 21.

Further, when the surface to be machined is spherical, the differential gear case 21 is rotated while only the pivot angle of the cutting tool 23 is changed, and the position in the axis a direction of the supporting member 22 is kept fixed. Consequently, the cutting tool 23 pivots about the pivot axis b and is capable of easily and surely machining the spherical surface portion m1.

Furthermore, when the surface to be machined has a flat portion orthogonal to the axis a of the supporting member 22 and a spherical portion continuing from the flat portion, the supporting member 22 is moved in the axis a direction in accordance with an increase in the pivot angle of the tool post 23 at the time of the machining of the flat portion, and only the pivot angle of the tool post 23 is changed and the position in the axis a direction is kept fixed at the time of the machining of the spherical portion.

As described above, in this embodiment, the tool post 5 moves the supporting member 22 in the Z-axis direction so that the machining point P of the cutting tool 23 moves on the flat surface to be machined as the pivot angle θ of the cutting tool 23 is increased by the movement of the tailstock 4. This makes it possible to easily and surely machine the surface to be machined even when the surface to be machined is a flat surface perpendicular to the axis a.

Further, in order to pivot the cutting tool 23, the Z-axis direction moving function of the tailstock 5 is utilized, and in order to move the supporting member 22 in the Z-axis direction, the Z-axis direction moving function of the cutting tool 5 is utilized. This makes it possible to realize the machining of not only a spherical surface to be machined but also a flat bearing surface by making use of the functions of an existing lathe.

It should be noted that the present invention is also capable of adopting a cutting tool having cutting edges at both ends, though the case where the cutting tool has the cutting edge only at one end is described in the foregoing embodiment.

Further, in the foregoing embodiment, a description is given of the case where the movable base moving the drive shaft 24 of the tool 20 is the tailstock, but this movable base may be a second spindle headstock or a second tool post.

Further, in the above-described embodiment, the differential gear case 21 is gripped and is rotary driven by the spindle headstock 3, but the following structure may be adopted: the differential gear case 21 is fixed, and the tool post 5 rotary drives the tool 20 about the axis a while the Z-axis direction positions of the tailstock 4 and the tool post 5 are controlled so that the machining point P of the chip 23a moves on a predetermined machining line.

Furthermore, in the present invention, the simultaneous machining of an outer surface to be machined located on an outer surface of a workpiece, concretely, the differential gear case 21 and an inner surface to be machined located on an inner surface thereof is possible. For example, the differential gear case 21 is gripped by the chuck 3a of the spindle headstock 3 and at the same time is rotated at a required rotation speed in a required rotation direction. Then, a depth of cut by a desired outer tool attached to the tool post 5 is controlled, and the position of the machining point P of the inner tool 20, and its rotation speed and rotation direction are appropriately and selectively controlled, similarly to the embodiment described above.

In this case, in the present invention, the rotation speed for machining the outer surface to be machined of the workpiece and the rotation speed for machining its inner surface to be machined can be set equal or can be set to any different rotation speeds. Specifically, the rotation speed at the time of the machining of the outer surface to be machined is the rotation speed of the workpiece, and the rotation speed at the time of the machining of the inner surface to be machined is a relative speed between the rotation speed of the workpiece and the rotation speed of the supporting member 22, that is, of the inner tool 20.

For example, in a case where 500 rpm is suitable for machining the outer surface to be machined of the differential gear case 21 and 1000 rpm is suitable for machining its inner surface to be machined, the depth of cut by the outer tool is controlled while the differential gear case 21 is rotated at 500 rpm. Further, as for the inner tool 20, the pivot angle of the cutting tool 23 and the axial position of the supporting member 22 are controlled so that its machining point P is located at a desired position, and at the same time, the supporting member 22 is rotated at 500 rpm in the reverse direction to the aforesaid direction. This can realize the simultaneous machining of the inner surface to be machined and the outer surface to be machined of the differential gear case 21 at different rotation speeds.

Further, for example, in a case where 500 rpm is suitable for machining the outer surface to be machined of the differential gear case 21 and 300 rpm is suitable for machining its inner surface to be machined, the depth of cut by the outer tool is controlled while the differential gear case 21 is rotated at 500 rpm. As for the inner tool 20, the supporting member 22 is rotated at 200 rpm in the same direction as the rotation direction of the differential gear case 21.

As described above, owing to the free selectability of the rotation speed for machining the outer surface to be machined and the rotation speed for machining the inner surface to be machined, the machining according to necessary machining speed or machining precision is enabled.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A machine tool which machines a surface to be machined located on an inner surface of a workpiece gripped by a spindle headstock, the machine tool comprising: the spindle headstock gripping the workpiece; a movable base disposed coaxially with said spindle headstock to be movable in an axial direction; and a tool post disposed between said movable base and said spindle headstock to be movable in the axial direction, wherein said tool post supports a tool having: a supporting member; a cutting tool which is supported to be pivotable about a pivot axis located on a plane perpendicular to an axis of the supporting member and has a cutting edge at one end; and a driving member pivoting the cutting tool by moving in the axial direction, wherein the axial-direction movement of the driving member is enabled by said movable base, and wherein, when the surface to be machined of the workpiece is machined, an axial position of said movable base and an axial position of said tool post are controlled so as to cause a machining point by the cutting edge to move along a desired machining line.

2. The machine tool according to claim 1, wherein said spindle headstock rotates the workpiece as well as gripping the workpiece.

3. The machine tool according to claim 2, wherein said movable base is one of a tailstock, a second spindle headstock, and a second tool post disposed coaxially with said spindle headstock to be movable in the axial direction, and wherein, when the surface to be machined of the workpiece is machined, said tool is moved in the axial direction by the movement of said tool post, and the workpiece is rotated by said spindle headstock while the cutting tool is pivoted by the movement of said movable base.

4. The machine tool according to claim 1, wherein said movable base is one of a tailstock, a second spindle headstock, and a second tool post disposed coaxially with said spindle headstock to be movable in the axial direction, and wherein, when the surface to be machined of the workpiece is machined, said tool is moved in the axial direction by the movement of said tool post, and said tool is rotated by said tool post while the cutting tool is pivoted by the movement of said movable base.

5. A workpiece inner surface machining method of machining a surface to be machined located on an inner surface of a workpiece by a machine tool which includes: a spindle headstock gripping the workpiece; a movable base disposed coaxially with the spindle headstock to be movable in an axial direction; a tool post disposed between the movable base and the spindle headstock to be movable in the axial direction; and a tool having: a supporting member; a cutting tool which is supported to be pivotable about a pivot axis located on a plane perpendicular to an axis of the supporting member and has a cutting edge at one end; and a driving member pivoting the cutting tool by moving in the axial direction, the method comprising:

a first step of supporting the workpiece by the spindle headstock;

a second step of supporting the tool by the tool post;

a third step of inserting the tool into the workpiece by moving the tool post to position the cutting tool at a machining start position; and a fourth step of controlling an axial position of the movable base and an axial position of the tool post so as to cause a machining point by the cutting edge to move along a desired machining line.

6. The workpiece inner surface machining method according to claim 5, wherein, when the surface to be machined is a flat surface perpendicular to the axis of the supporting member, in said fourth step, the tool post changes the axial position of the supporting member as the movable base changes a pivot angle of the cutting tool.

7. The workpiece inner surface machining method according to claim 5, wherein, when the surface to be machined is a spherical surface whose center is at a point located on the axis, in said fourth step, the movable base changes a pivot angle of the cutting tool and the tool post keeps the axial position of the supporting member fixed.

8. The workpiece inner surface machining method according to claim 6, wherein the spindle headstock rotates the workpiece about the axis in said fourth step.

9. The workpiece inner surface machining method according to claim 6, wherein the tool post rotates the tool about the axis in said fourth step.

10. The workpiece inner surface machining method according to claim 7, wherein the spindle headstock rotates the workpiece about the axis in said fourth step.

11. The workpiece inner surface machining method according to claim 7, wherein the tool post rotates the tool about the axis in said fourth step.

* * * * *